(12) United States Patent
Chaudhuri (10) Patent No.: US 7,583,661 B2
(45) Date of Patent: Sep. 1, 2009

(54) METHOD AND APPARATUS FOR IMPROVED IP NETWORKS AND HIGH-QUALITY SERVICES

(75) Inventor: Sid Chaudhuri, Darren Ct., East Brunswick, NJ (US) 08816-5154

(73) Assignee: Sid Chaudhuri, East Brunswick, NJ (US)

( * ) Notice: Subject to any disclaimer, the term of this patent is extended or adjusted under 35 U.S.C. 154(b) by 640 days.

(21) Appl. No.: 11/071,493

(22) Filed: Mar. 3, 2005

(65) Prior Publication Data

US 2005/0195815 A1  Sep. 8, 2005

Related U.S. Application Data

(60) Provisional application No. 60/550,203, filed on Mar. 5, 2004.

(51) Int. Cl.
  *H04L 12/66* (2006.01)
(52) U.S. Cl. .......................... 370/353; 370/355
(58) Field of Classification Search .......... 370/352–356
  See application file for complete search history.

(56) References Cited

U.S. PATENT DOCUMENTS 6,026,086 A * 2/2000 Lancelot et al. ............. 370/353
6,882,640 B1 * 4/2005 Berger et al. ................ 370/353
2002/0174434 A1 * 11/2002 Lee et al. ...................... 725/74
2002/0191588 A1 * 12/2002 Personick .................... 370/352

FOREIGN PATENT DOCUMENTS

EP     230676 A2 * 8/1987

* cited by examiner

*Primary Examiner*—Chirag G Shah
*Assistant Examiner*—Otis L Thompson, Jr.

(57) ABSTRACT

The present invention provides a new type of router, called a PACS router, to build an improved IP network in which high-quality services such as voice and best-effort data services can be provided with higher reliability and lower cost. A PACS router includes a packet-switching fabric and a circuit-switching fabric interconnected by channelized high-speed links. A network built with PACS routers uses signaling and routing protocols to segregate traffic into different classes and route them using circuit-channels and packet-channels depending on quality of service requirements. Routing high-quality service over circuit-channels eliminates transit delay typically incurred in packet-switching fabrics, enhances reliability from software malfunction in the router and enhances network scalability by not having to terminate all traffic into packet-switching fabrics in every router. The circuit-switching fabrics in the PACS routers provide further immunity by fast rerouting of failed circuits via alternate routes when a network fault is detected.

18 Claims, 8 Drawing Sheets

METHOD AND APPARATUS FOR IMPROVED IP NETWORKS AND HIGH-QUALITY SERVICES

CROSS-REFERENCE TO RELATED APPLICATION

This application claims the benefit of U.S. provisional application Ser. No. 60/550,203, filed 5 Mar. 2004, entitled "Method and Apparatus for Improved IP Networks and High-Quality Services," which is incorporated by reference.

FIELD OF THE INVENTION

The present invention relates to communications networks in general, and, more particularly, to IP routers and circuit switches.

BACKGROUND OF THE INVENTION

The telephony network has evolved over many decades; particularly since the 1960s, when stored-program-controlled switches with specific engineering requirements for voice telephony were deployed. Engineering requirements that are critical to achieve high-quality voice telephony include: (1) guaranteed bandwidth, (2) minimum network delay, and (3) a very low probability (≦0.1%) that a network would block an attempted call or drop an ongoing call. Transmissions that satisfy these engineering requirements are defined for the purposes of this specification as "high-quality traffic".

The Internet, on the other hand, has evolved over the last decade to transport mostly computer data originating from web browsing, document and music downloading, and e-commerce. Yet traffic on the Internet surpassed the total traffic on the voice telephony network several years ago. While the volume of traffic on the Internet is increasing, network requirements for computer data traffic need not be as stringent as for voice telephony, however.

The operations and maintenance of the separate voice telephony network is expensive given that the ratio of telephony traffic to Internet data traffic will continue to decrease.

While Internet Protocol (IP) telephony, also known as voice over IP (VoIP) service, has been introduced several years ago, the quality of VoIP service has not yet been at par with the quality of service on the pre-existing voice telephony network. The Internet substantially operates in a "best-effort" delivery mode for packets that are traversing its network. Packets are forwarded from one node (i.e., a signal termination or transit point in a network, such as an IP router in an IP network or a cross-connect in a voice network) in the network to the next node with no regard for the capacity available in the link between the nodes or delay that the packets might encounter, and without a guarantee that the packets will be delivered to their final destination. Transmissions made in a best-effort manner, as described above, are defined for the purposes of this specification as "best-effort traffic".

The quality of VoIP services is degraded by multiple factors that include: (a) latency for a packet to travel from source to destination (i.e. transit delay), (b) variation in latency from one packet to another commonly known as jitter, and (c) loss of packets. In an effort to mitigate the degradation in service quality due to these factors, some characteristics of the circuit-switched telephony network have been incorporated into the VoIP service network. For example, Multi-Protocol Label Switching (MPLS) has been developed and deployed in some best-effort packet switching networks in order to mimic the circuit-switching features of high-quality service. In spite of these improvements for VoIP implementation in IP networks, the basic nature of the packet switching devices, wherein the header of each packet is examined and then the packet is forwarded to a next destination (i.e., the next "hop"), remains a fundamental challenge to providing ubiquitous high-quality VoIP service over an IP network. On the other hand, costly maintenance and operation of the old circuit-switched voice telephony network for a diminishing fraction of the total information traffic offers a challenge as well as an opportunity to offer both best-effort traffic and high-quality traffic in an integrated network.

A typical telephony network comprises a set of stored program controlled (SPC) switching systems, known as Class V switches, which are interconnected by digital links, referred to as "trunk" lines. The Class V switches provide the interconnection between customer voice access lines and the trunk-lines. Each Class V switch can terminate up to tens of thousands of customer access voice lines. A circuit (i.e., the connection from a first customer access line to a second customer access line through the network) is established through one or more Class V switches, and the connectivity is based on a signaling scheme, such as Signaling System 7 (SS7).

Each voice channel is carried on a single 64 Kb/s digital stream known as a DS0 signal. Each trunk-line carries multiple DS0 signals in a higher level of digital stream; 24 DS0 signals compose a DS1 signal in North America, while 32 DS0 signals compose an E1 signal in Europe and elsewhere. The plurality of DS0 signals are multiplexed into the higher level signals using Time Division Multiplexing (TDM). Hence the digital voice telephony network is also called TDM network. The DS1 signals are further multiplexed to higher bit streams using an older asynchronous TDM scheme to DS2 (6.312 Mb/s) and DS3 (44.712 Mb/s) digital signals.

A newer TDM technique known as Synchronous Optical Network (SONET) mostly used in North America and Synchronous Digital Hierarchy (SDH) in other parts of the world are used to multiplex the lower level digital signals, such as DS1 and DS3, to a much higher-speed signal, such as OC-48 (2.5 Gb/s) or OC-192 (10 Gb/s), a number of which in turn are wave division multiplexed by a Wavelength Division Multiplexing (WDM) system for long distance transport over optical fiber. Even though SONET and SDH technologies are very similar now, historically they were developed for multiplexing 24-cahnnel and 32-channel digital streams to synchronous optical signals. However, the two hierarchies and standards evolved to converge so that there is practically no difference between the two. Thus henceforth only 24-channel terminology will be used even though all aspects of this application shall apply equally to the 32-channel system.

A transport network multiplexes low-level signals, transports the multiplexed high-speed signal over a long distance, and then demultiplexes it to extract the lower level signal for connection to Class V switches and other service access systems at the distant location. In addition to the management of the interconnectivity of the service access systems, a transport network provides another key network function, namely, network protection and restoration. In the case of a network link or equipment failure, the transport network finds alternate route to restore affected connections via alternate links or routes among the service access systems within a fraction of a second, thereby making the service systems immune to network failures.

While the transport network provides robust connectivity and management of the connectivity of voice-switches, such as Class V switches, it does not participate in making decisions on how a DS0 signal within a trunk-line is used to route a call. The voice-switches provide the routing function using a signaling scheme, such as SS7, and a different signaling scheme, such as tip-and-ring, between a voice-switch and a user terminal, such as a telephone.

The telephony network meets the key voice service requirements by its nature of being a circuit-switching network and by proper engineering of the network. A fixed bandwidth requirement to transmit a voice signal between two parties is automatically met by the nature of the circuit-switched network. When a connection is made it is of a fixed bandwidth typically 64 Kb/s between the two devices and the circuit is used exclusively for one call during the call session. Telephony network meets the minimum delay requirement also because of the nature of circuit-switching technology. A circuit switch device does not need to continuously process the circuit in the transit nodes once the connection is established. Thus, the delay for a voice signal from one end to the other is kept at a minimum, which is essentially the transit delay, required for the electrical or optical signal to travel over the transmission medium. The requirement on minimum call blocking probability is met by proper engineering. Using traffic characteristics such as incoming call volume, call duration etc. and traffic engineering techniques, an appropriate number of trunk-lines are configured in a switch to keep the call blocking probability to a required minimum level. In addition, call-dropping probability is kept at a minimum by using the network protection and restoration techniques in the transport network to further enhance the reliability of the trunk-lines.

An IP network is essentially a network of computers to exchange data usually between server and client computers. An IP network comprises a set of IP routers that are connected by high-speed SONET/SDH links on one side and the server and client computers on the other. The application programs running in the client/server computers generate information packets each with a destination address added at the header of the packet. The routers then forward each packet independently, using a set of routing protocols.

Unlike in a telephony network, there is no signaling to first establish an end-to-end fixed bandwidth connection for a packet stream in an IP network. Instead, each router has the means to generate and update a routing table, which includes all reachable IP addresses in the network. A router upon receiving a packet looks at the destination address in the packet; checks the routing table for best match with the destination address and decides which interface it will forward the packet to its next hop router. This process is repeated in each router on the route of a packet until it reaches the final destination.

The computer application program at the other end removes the added information bytes from the packets and then assembles the packets to generate the information for presentation to the user, whether it is a document, a picture or music. The packets from a single application may even arrive via different routes and in a different sequence than the one generated at the source. The application program stores these packets and rearranges the sequence for the information to be presented to the user. The process of storing the packets for rearrangement adds further delay to the information transport. In addition, the transmission links between routers are shared among different applications passing through a router. Thus, there is no guarantee that a specific application session will have a minimum bit rate capacity or bandwidth along its routes.

In an IP network, packets are discarded when there is a shortage in link capacity. When packets are discarded, the application layer program detects that packets are missing, and requests the sender of the missing packets to resend them. The process of resending also adds to the overall delay. Delay, however, is not detrimental to best-effort traffic. The IP network is not well suited, however, for applications wherein high-quality traffic, such as VoIP, video telephony and videoconferencing, is transmitted.

IP routers are being updated with some capabilities to deal with these impairments. For example, some applications may extend the headers of high-quality traffic packets with one or more markers that designate these packets for special handling. These markers may include: source-routing, in which the source specifies the entire route to be taken by the packets; a quality of service (QoS) indicator, which specifies routing priority for high-quality traffic packets over best-effort traffic packets; or routing protocols, such as MPLS or VPN, which emulate circuit behavior within routers. These features mitigate, to some extent, the IP network deficiency for high-quality traffic. It is well known, however, that they tend to degrade the performance of routers, which are most efficient for routing packets that do not contain markers.

A media gateway function is required between an IP network and a TDM network in order to provide voice telephony service between a user connected to the IP network and another user connected to the TDM network. The media gateway transcodes between packet based voice, VoIP, onto a TDM network.

In addition to the media gateway function, it is also possible to incorporate packet switching fabric for VoIP services in the same system. The two switching fabrics may be implemented in a single hardware or in separate hardware but under a common control and signaling infrastructure. A set of signaling and routing protocols for call control such as SS7, SIP, MGCP and others can unify services in an integrated network for both traditional and IP based access means such as voice access over wire pairs and VoIP access such as cable modem and DSL. While the integrated media gateway and circuit-switching system technology offers a means for interworking between the TDM voice network and IP network, voice calls in the IP network are still routed hop-by-hop and packet-by-packet in the IP network.

The telephony network meets the stringent reliability and latency requirements using circuit-switching technology (also known as TDM technology), while an IP network provides flexible and low-cost data communications that do not impose stringent requirements for voice telephony. However, operations and maintenance of a separate voice network for a small fraction of the total traffic is expensive. While an integrated media gateway and voice-switch allows voice calls to flow seamlessly from IP network to TDM network, the cost and complexity to route both high-quality and best-effort traffic in the IP network still remain significant issues. Furthermore, efficient interconnection of voice-switches continues to be problematic. In a network, each switch needs to communicate with every other switch for call set up as well as call routing. However, it is impractical to interconnect every switch with every other switch since such interconnection would require that the number of links grow as the square of the number of switches in a network.

A traditional voice network typically deploys tandem switches, which are intermediary switches that facilitate the interconnection of voice switches. For example, a tandem switch is used to route a call between two voice-switches to which it is connected when the two voice-switches do not have a direct link between them. The tandem switch routs the call in response to a request from one of the two voice-switches. Several layers of tandem switches typically exist in a traditional voice network for providing such connectivity.

An IP network on the other hand is a flat network that routes traffic hop-by-hop. For example, traffic between two routers A and D that are not directly connected but connected through a chain of routers B and C, with links AB, BC and CD, would flow from A to B over link AB, B to C over link BC and finally from C to D over link CD. At each intermediate node B and C the transport links are terminated and all packets are extracted at the intermediate nodes and reassembled in the next link with other traffic. The termination of the transport links and routing via the packet-switching fabrics in routers at each intermediate node is expensive and it is difficult to build larger packet fabric to route transit traffic. In addition, such hop-by-hop transfer adds unnecessary delay in each intermediate node. Thus there is a need for a device to build an integrated network that would meet the same robustness and delay requirements for high-quality traffic while providing flexible, low-cost and scalable transport of best-effort traffic.

Figure 1:
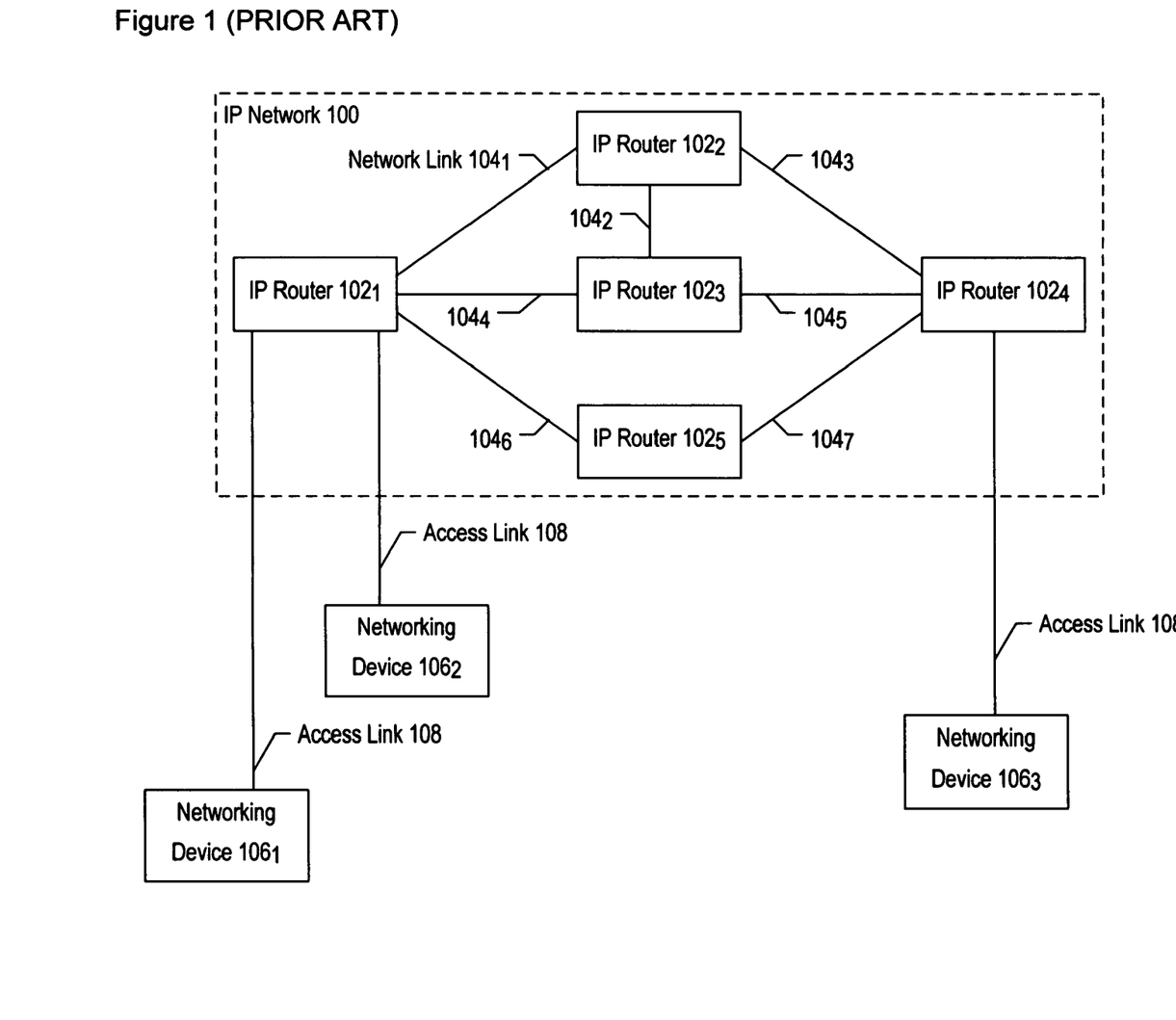
FIG. 1 depicts an IP network according to the prior art.

FIG. 1 depicts an IP network according to the prior art. IP network 100 is a packet-switched network, i.e. information is carried from one network element to another by means of breaking messages up into discrete, variable length packets. Each packet contains a header section, which includes information about the destination address, source address, packet's priority, etc., and a payload section, which contains the data that makes up a portion of the message. IP network 100 comprises IP routers, $102_1$ through $102_5$, which are interconnected in a network configuration via links $104_1$ through $104_7$. For example, IP router $102_1$ is connected to IP routers $102_2$, $102_3$, and $102_5$, via links $104_1$, $104_4$, and $104_6$, respectively. Each of links $104_1$ through $104_7$ may be an aggregate link of multiple OC-48 or OC-192 links.

IP router $102_i$, where i=1 through 5, provides connectivity between user equipment $106_1$ through $106_3$ using packetized data transmissions over network links $104_1$ through $104_7$. IP router $102_i$ comprises logic circuitry, memory, and routing information and protocols that enable IP router $102_i$ to receive an information packet, examine the packet, determine the destination for the packet, and decide on an immediate, potentially intermediate, destination for the packet. IP router $102_i$ then transmits the packet to its immediate destination over either a network link (if the final destination is not connected to IP router $102_i$) or an access link (if the destination is directly connected to IP router $102_i$). IP router $102i$ is described below and with respect to FIG. 2.

Network link $104_i$ comprises a plurality of OC-48 and OC-192 signal lines, which carry high-bandwidth transmissions between IP routers (e.g., network link $104_1$ provides transmissions between IP router $102_1$ and $102_2$). In many instances, IP router $104_i$ will aggregate packets that originated as part of different signals into a single transmission at OC-48 or OC-192 rates.

IP network 100 operates in a best-effort, hop-by-hop manner. For example, a transmission by user equipment $106_1$, which has an intended destination $106_3$, is spread over multiple packets of data. Each packet includes header information, which contains the intended address for that packet. IP router $102_1$ receives each packet from user equipment $106_1$, and examines the destination header of each packet and decides which router to forward the packet to based on an internal connectivity table (i.e., a routing table). Each packet of the transmission may be sent to a different IP router, which is connected to $102_1$, and may be joined with other packets to compose an OC-48 or OC-192 signal. Each IP router that receives a packet then goes through the same process, wherein it examines the destination header and decides which IP router to which it is connected should receive the packet (i.e., decides on the next hop). Hop-by-hop routing continues until each packet is received by IP router $102_4$, which is connected to user equipment $106_3$. The packets that compose the transmission may arrive at user equipment $106_3$ in any order and each packet can incur various time delays that affect the total delay in user equipment $106_3$ receiving the transmission in its entirety.

The simplicity of best-effort, hop-by-hop routing and uniformity of signaling and routing protocols make IP network 100 easy to operate. However, IP network 100 is deficient in delivering high-quality services efficiently, in providing scalability and robustness because each intermediate router must route transit traffic packet by packet.

Figure 2:
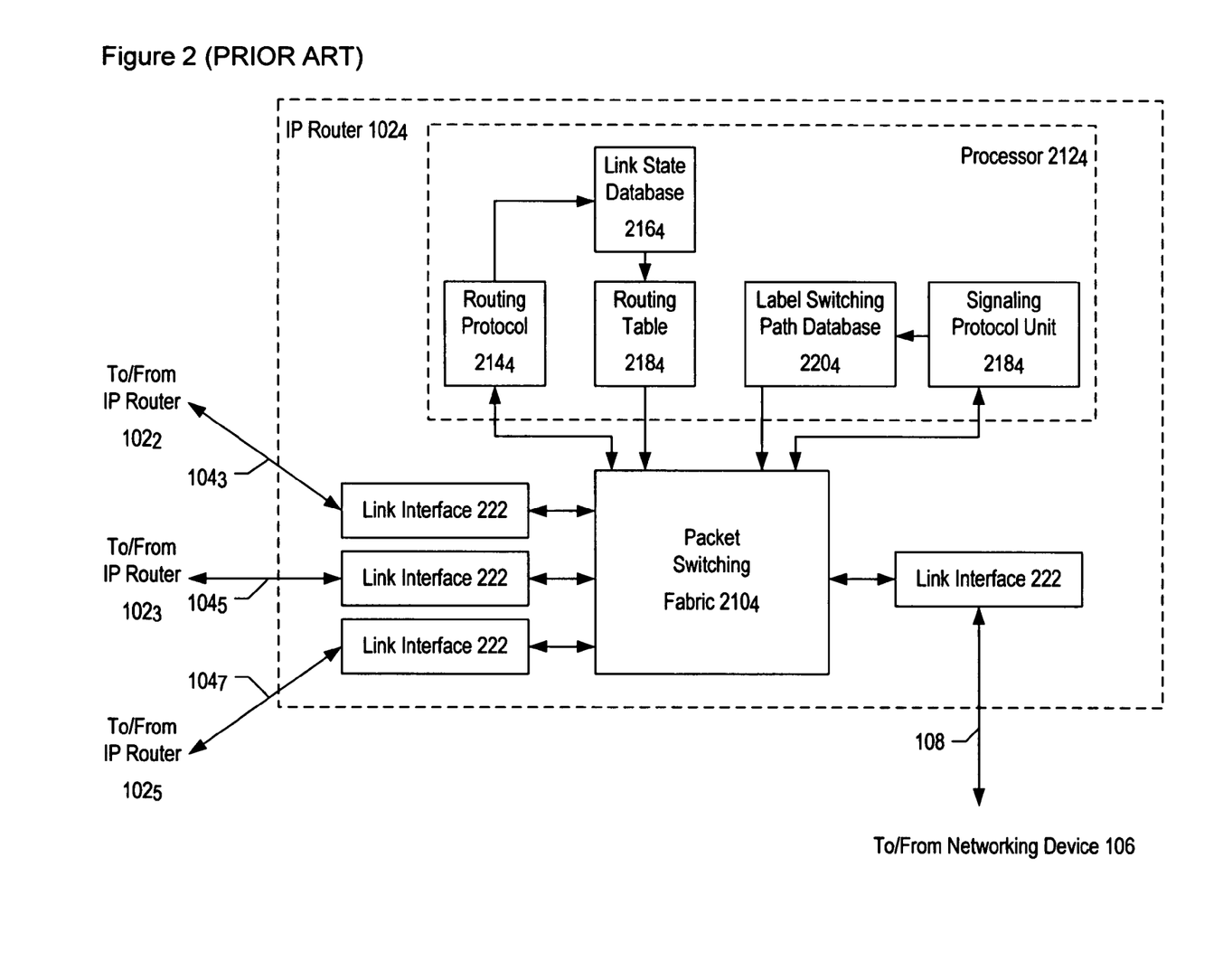
FIG. 2 depicts a schematic diagram of the salient components of an IP router in accordance with the prior art.

FIG. 2 depicts a schematic diagram of the salient components of an IP router in accordance with the prior art. Router $102_4$, which is representative of IP routers $102_1$ through $102_5$, comprises packet-switching fabric $210_4$, processor $212_4$, and link interfaces 222. Processor $212_4$ comprises logic circuitry and memory and includes routing protocol $214_4$, link state database $216_4$, routing table $218_4$, label switching path database $220_4$, and signaling protocol $218_4$.

Packet switching fabric $210_4$ is a matrix of electronic switches and logic circuitry that receives a packet, reads the destination header of the packet, compares it to the closest match in routing table $218_4$ to determine the next hop destination, and sends the packet out on the appropriate network link where a link interface assembles the packet into a signal such as a SONET signal ready for transport to the next IP router.

Signaling protocol unit $218_4$ sends and receives protocol messages through the packet fabric using the links $104_3$, $104_5$, and $104_7$. Based on these messages each router learns the existence of other routers connected in the network and how they are connected i.e., the network topology. As a result, each router creates and maintains the topology information in link state database $216_4$. Link state database $216_4$ is used to generate routing table $218_4$ using a variety of algorithms such as shortest path routing. In addition, if the router has the capability to route a set of packets grouped in a data stream called a Forwarding Equivalency Class (FEC) based on certain criteria such as a higher QoS requirement using labels instead of destination headers. Then IP router $102_4$ uses signaling protocol such as RSVP and CR-LDP to create label switching paths (LSP) database $220_4$. LSP database $220_4$ is then used to route packets based on the label header instead of the destination header of the packet.

Figure 3:
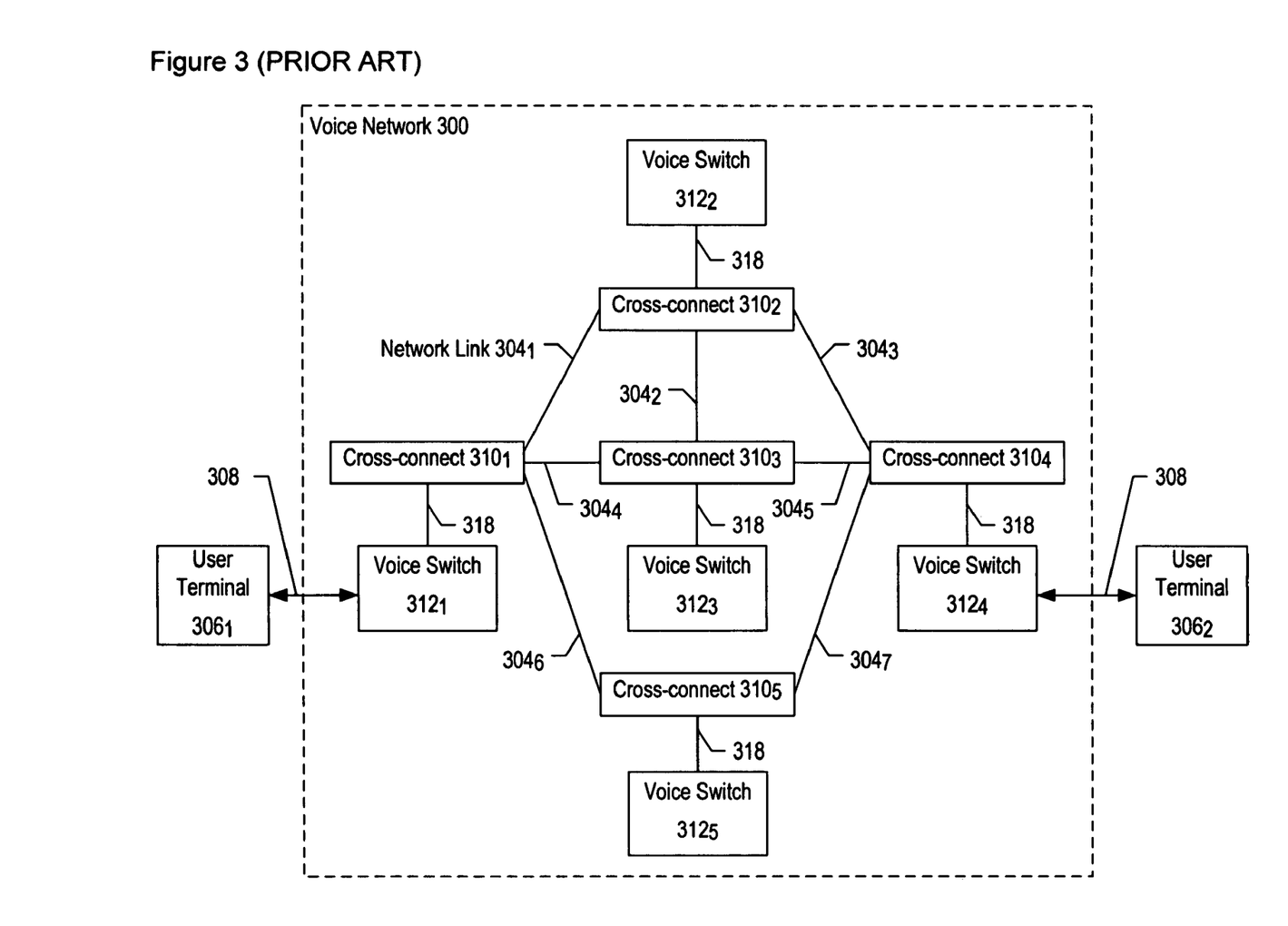
FIG. 3 depicts a schematic diagram of the salient components of a voice network in accordance with the prior art.

FIG. 3 depicts a schematic diagram of the salient components of a voice network in accordance with the prior art. Voice network 300 comprises voice-switches $312_1$ through $312_5$ which are connected via cross-connects $310_1$ through $310_5$. Cross-connects $310_1$ through $310_5$ are interconnected by network links $304_1$ through $304_7$. Voice-switches $312_1$ through $312_5$ are connected to cross-connects $310_1$ through $310_5$ by trunk links 318.

Cross-connect $310_i$, where i=1 through 5, is a circuit-switching fabric and an associated fabric controller that interconnects any one of N inputs to any one of M outputs. Cross-connect $310_i$ will be described below and with respect to FIG. 4.

Voice-switch $312_i$, where i=1 through 5, is a DS0-signal-level voice-switching fabric which provides connections between voice terminals $306_1$ and $306_2$. The connections between user terminals $306_1$ and $306_2$ are made via voice-switches using signaling such as SS7 signaling. Cross-connect $310_i$ provides multiplexing of low-speed signals from the voice-switches to high-speed signals such as OC-48 and OC-192 for transmission to other nodes; provides demultiplexing of a high-speed signal such as OC-48 and OC-192 arriving from a first node; connects one or more low-speed signals from the arriving high-speed signal to the voice-switch connected to cross-connect $310i$; and provides multiplexing the remaining low-speed signals within the arriving high-speed signal and one or more low-speed signals arriving from the voice-switch $312_i$ into a high-speed signal such as OC-48 and OC-192 for transmission to a second node in the network.

Cross-connect $310_i$ is typically operated via external commands from a Network Management System (not shown). Based on forecasted demands and traffic patterns a network design is developed which provides the number of low-speed links 318 connecting voice-switches $312_i$ to cross-connect $310_i$. Based on this connectivity design, the cross-connect management systems configure cross-connects $310_1$ through $310_5$ to implement the network design (i.e., the switch connectivity). The connectivity typically remains static for several months until a new network design based on new demand forecast is implemented.

Cross-connect $310_i$ also provides another key transport function, namely, restoration from catastrophic network failures such as a fiber cut. When a failure is detected, cross-connects $310_1$ through $310_5$ autonomously detect the failure and reconnect the failed links via an alternate route using network links reserved for restoration.

Figure 4:
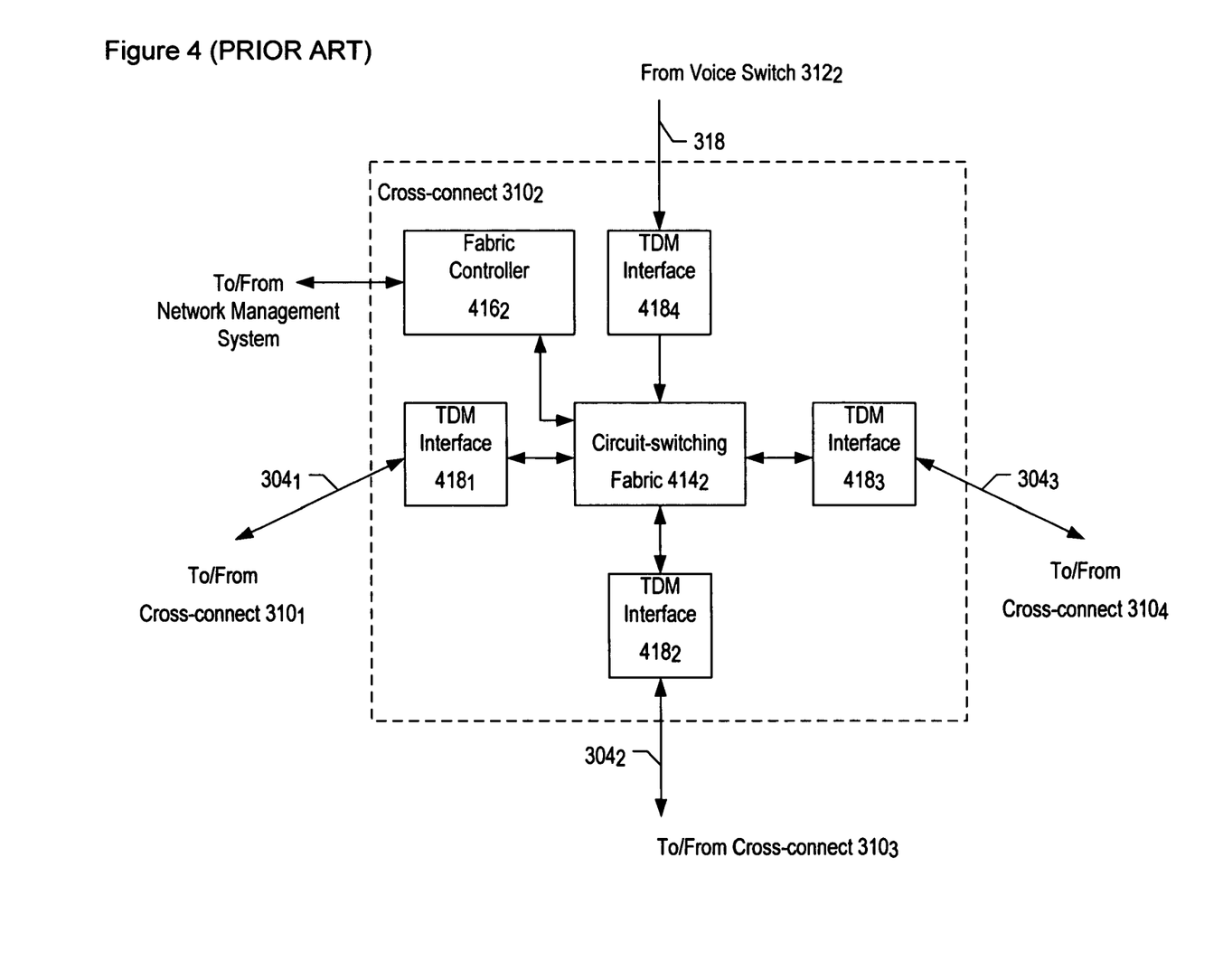
FIG. 4 depicts a schematic diagram of the salient components of a cross-connect in accordance with the prior art.

FIG. 4 depicts a schematic diagram of the salient components of a cross-connect in accordance with the prior art. Cross-connect $310_2$, which is representative of each of cross-connects $310_1$ through $310_5$, comprises circuit-switching fabric $414_2$, fabric controller $416_2$, and TDM interfaces $418_1$ through $418_4$.

Circuit-switching fabric $414_2$ is a matrix of electronic logic that interconnects any one of N inputs to any one of M outputs.

Fabric controller $416_2$ is a processor, which provides control over the connectivity between each of the N inputs and each of the M outputs of circuit-switching fabric $414_2$. Fabric controller $416_2$ interprets instructions provided by the Network Management System and translates these instructions into the specific switch configuration required to establish appropriate connectivity within circuit-switching fabric $414_2$.

TDM interfaces $418_1$ through $418_3$ terminate overheads of incoming signals on network links $304_1$, $304_2$, and $304_3$. Overheads include section overheads and line overheads of OC-48 and OC-192 signals arriving at TDM interfaces $418_1$ through $418_3$, which are first terminated at the interfaces for network performance monitoring, multiplexing lower level digital bit streams into higher level signals such as OC-48, demultiplexing of higher level signals coming from the network links into lower level digital signals or tributaries. Lower level digital signals in appropriate formats from the TDM interfaces $418_1$ through $418_3$ are then sent to circuit-switching fabric $414_2$. Cross-connect $310_2$ does not terminate SONET Path overhead since packets inside the SONET payloads are not extracted in the cross-connect $310_2$.

Circuit-switching fabric $414_2$ then connects the lower level digital signals (i.e., tributaries) to appropriate interfaces for multiplexing and transporting to the next node. Upon receiving a command from a network management system or detecting a network failure, affected circuit-switching fabrics of cross-connects $310_1$ through $310_5$ change their corresponding circuit-switching fabric $414_1$ through $414_5$ configurations to, in the case of a received command, provide the connectivity specified by the network management system, or, in the case of a detected network failure, a pre-configured protection circuit. Cross-connects $310_1$ through $310_5$ do not participate in signaling that voice-switch $312_i$ uses to set up and control voice calls.

SUMMARY OF THE INVENTION

The present invention provides methods and systems for providing communications services in a communications network without some of the costs and disadvantages for doing so in the prior art. In the present invention, methods and systems for providing both best-effort communications data and delay-sensitive, high-quality communications data in a single integrated communications network, which comprises a new type of router, hereinafter referred to as a "Packet-switching and Circuit-switching System (PACS) router". A communications network comprising PACS routers provides improved performance in some metrics, such as performance, cost efficiency, reliability and scalability, over communications systems in the prior art.

A PACS router comprises a plurality of switching devices, at least one circuit-switching fabric and at least one packet-switching fabric, and channelized high-speed links between the packet-switching fabrics and the circuit-switching fabrics. There are three key elements of the present invention. First, a packet-switching fabric in a first PACS router is connected to a packet-switching fabric in a second PACS router via circuit-switching fabrics in each of the PACS routers. Second, a link between a packet-switching fabric and a circuit-switching fabric in a PACS router is channelized, wherein multiple low-speed signals are multiplexed, using TDM, into a high-speed signal. Channelized links enable the circuit-switching fabric to route low-speed signals without terminating their payloads to extract packets from the signals. Therefore, the circuit-switching fabric can route transit traffic (i.e., traffic which originates and terminates in other PACS routers) without being required to extract packets from the signals' payloads. Third, a PACS router utilizes a set of signaling and routing protocols that enable its packet-switching fabric and circuit-switching fabric to route both best-effort traffic and high-quality traffic with higher efficiency, better reliability, and lower cost.

According to one aspect of the present invention, a PACS router characterizes a low-speed channel within a channelized high-speed link as: (1) a packet-channel when best-effort traffic is being routed by the low-speed channel; or (2) a circuit-channel when high-quality traffic is being routed by the low-speed channel. In a PACS router, only the packet-channels are terminated; packets are extracted; and then each packet only within the packet-channel is routed by the packet fabric at each intermediate PACS router on the route of the packets. Circuit-channels, on the other hand, are not terminated at intermediate PACS routers. The circuit-channels are routed via the circuit-switching fabrics at intermediate PACS routers so that they remain as circuits between the originating PACS router and the final destination PACS router.

In another aspect of the present invention, an end PACS router, (i.e., a PACS router which receives both best effort traffic and high-quality traffic from networking devices and user terminals to which it is directly connected via acces links), segregates best-effort traffic into at least one packet-channel and high-quality traffic into at least one circuit-channel. It should be noted that an end PACS router is simultaneously an intermediate PACS router for traffic that originates and terminates in other PACS routers to which it is connected via network links. Packet-channels are terminated into the packet-switching fabrics at intermediate PACS routers to extract the packets in these channels, as is known in the prior art. The extracted packets are then forwarded in hop-by-hop fashion to other PACS routers. A PACS router routes high-quality traffic to another PACS router via circuit-switching fabrics without terminating the channels into packet fabrics at intermediate PACS routers.

In yet another aspect of the present invention, a PACS router comprises a processor, which implements a control system to manage channel inventory, network connectivity, and traffic routing. The processor uses signaling and routing protocols to route both packet-channels and circuit-channels in the PACS network. A PACS router uses packet-channels to transmit control, protocol, and management packets.

In another aspect of the present invention, a PACS router utilizes its circuit-switching fabric to provide fast restoration of traffic affected by a link failure, such as a fiber break. A PACS router provides faster failure detection than routers known in the prior art. Once a PACS router detects a failure, it reroutes affected traffic via its circuit-switching fabric and circuit-switching fabrics of other PACS routers in the network to restore connectivity. Therefore, a network comprising PACS routers is more stable and robust a network comprising routers known in the prior art.

DETAILED DESCRIPTION

Figure 5:
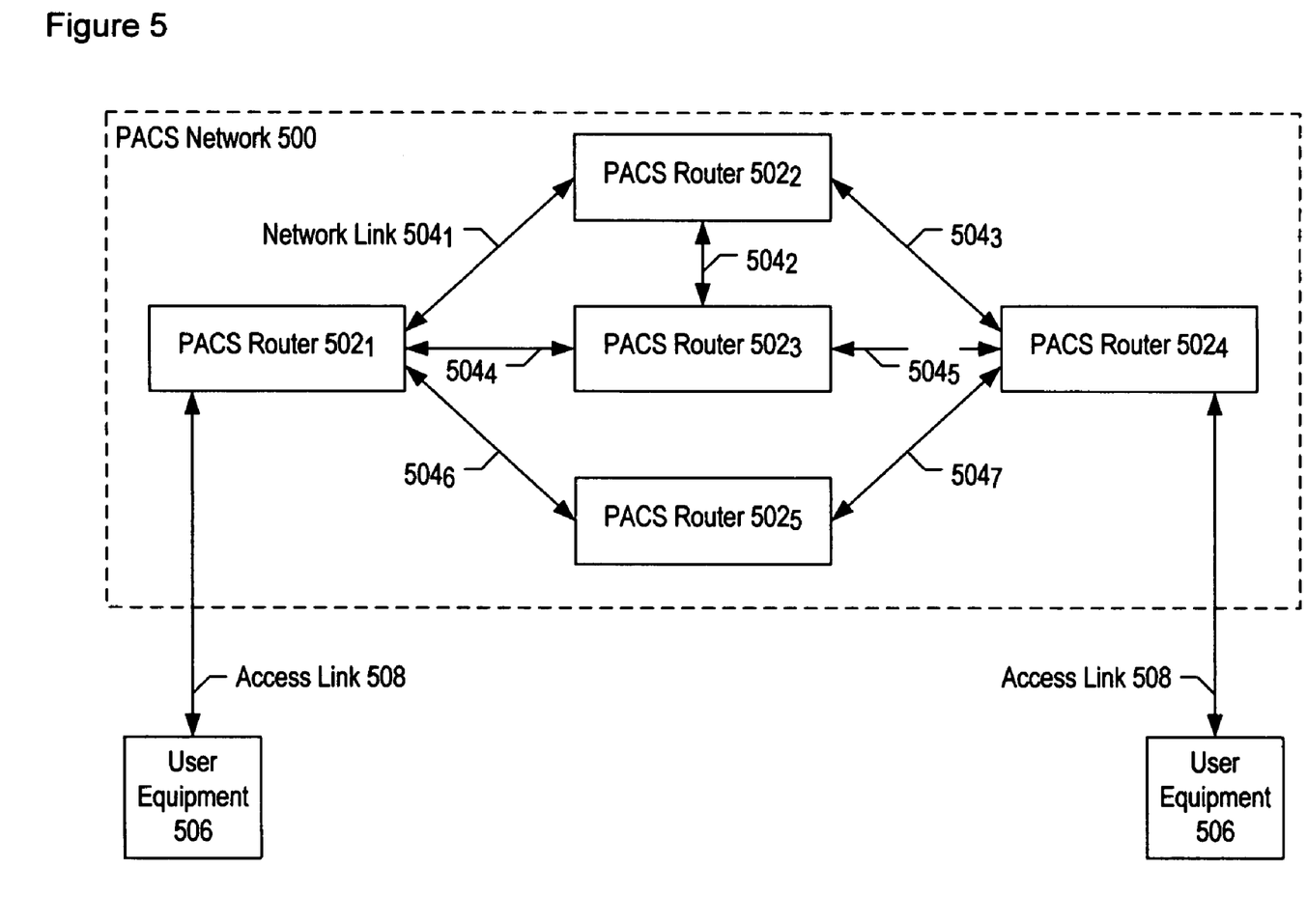
FIG. 5 depicts a block diagram of the salient aspects of a communications network in accordance with the illustrative embodiment of the present invention.

FIG. 5 depicts a block diagram of the salient aspects of a communications network in accordance with the illustrative embodiment of the present invention. PACS network 500 comprises PACS routers $502_1$ through $502_5$ and network links $504_1$ through $504_7$. PACS network 500 is interconnected to user equipment 506 via access links 508.

PACS router $502_i$, where i=1 through 5, is a network router capable of switching signals that comprise either information circuits or information packets to any PACS router or user equipment to which it is connected based on a quality-demand associated with each signal. PACS router $502_i$ is described below and with respect to FIG. 6.

Network link $504_i$, where i=1 through 7, is a multi-channel, bi-directional communications link which comprises a plurality of circuit-channels and a plurality of packet-channels. Network link $504_i$ interconnects transmitters of a first PACS router with receivers of a second PACS router to provide communication in one direction, and interconnects transmitters of the second PACS router with receivers of the first PACS router to complete the bi-directional communications link. For example, network link $504_4$ interconnects transmitters of PACS router $502_1$ with receivers of PACS router $502_3$, and interconnects transmitters of PACS router $502_3$ with receivers of PACS router $502_1$.

User equipment 506 is a superset of network devices 106 and user terminals 306, as described above and with reference to FIG. 1 and FIG. 3. It will be clear to those skilled in the art how to make and use user equipment 506.

PACS access link 508 combines the functionality of access link 108 and access link 308. Access link 108 and access link 308 are described above and with reference to FIG. 1 and FIG. 3. PACS access link 508 provides interconnection between a PACS router, for example $502_1$, and user equipment 506. In some alternative embodiments, PACS access link 508 includes intermediate equipment such as a gateway switch, voice-over-IP access router, or access router between PACS network 500 and user equipment 506. It will be clear to those skilled in the art, after reading this specification, how to make and use access links 508.

Although PACS network 500 comprises four PACS routers, it will be clear to those skilled in the art, after reading this specification, how to make and use alternative embodiments of the present invention in which PACS network 500 comprises any number of PACS routers. Furthermore, it will be clear to those skilled in the art, after reading this specification, how to make and use alternative embodiments of the present invention in which PACS network 500 is interconnected to any number of user equipments 506.

Figure 6A:
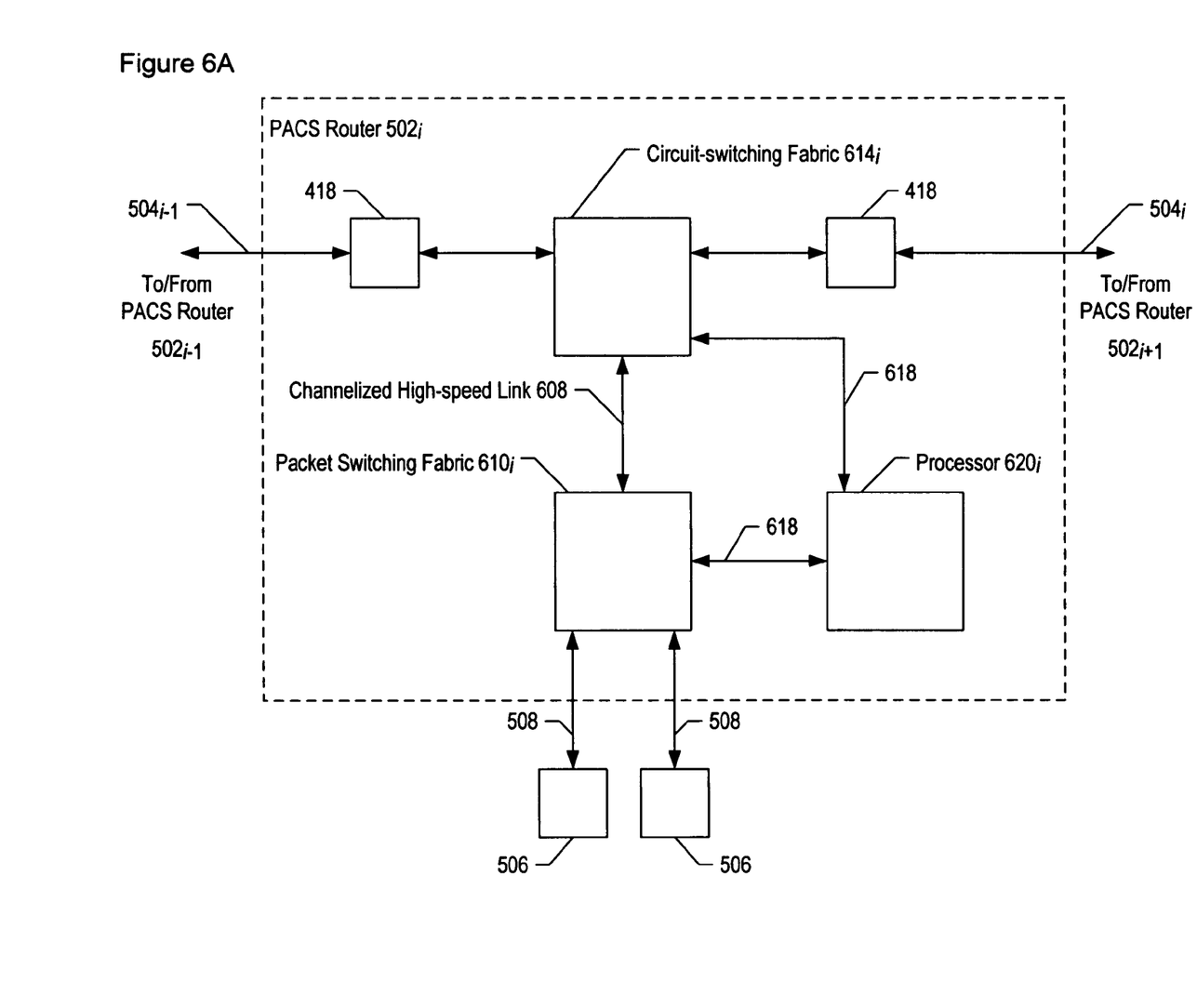
FIG. 6A depicts a block diagram of the salient aspects of a PACS router in accordance with the illustrative embodiment of the present invention.

FIG. 6A depicts a block diagram of the salient aspects of a PACS router in accordance with the illustrative embodiment of the present invention. PACS router $502_i$ comprises circuit-switching fabric $614_i$, packet switching fabric $610_i$, processor $620_i$, channelized high-speed link 608, and TDM interfaces 418. Processor $620_i$ is connected with the packet-switching fabric $610_i$ and the circuit-switching fabric $614_i$ via control links 618.

Channelized high-speed link 608 provides connectivity between packet-switching fabric $610_i$ and circuit-switching fabric $614_i$. Channelized high-speed link 608 is a chip-to-chip electrical interface, which carries data in parallel format instead of in high-speed serial format. Channelized high-speed link 608 logically comprises low-speed circuit-channels and packet-channels between packet-switching fabric $610_i$ and circuit-switching fabric $614_i$. It will be clear to those skilled in the art, after reading this specification, how to make and use alternative embodiments of the present invention wherein channelized high-speed link 608 is a high-speed serial link.

Circuit-switching fabric $614_i$ is a matrix of electronic logic and switches that interconnect any one of N inputs to any one of M outputs where the inputs and outputs are DS1 signals. In the illustrative embodiment, N is equal to 256 and M is also equal to 256. It will be clear to one skilled in the art, after reading this specification, how to make and use alternative embodiments that comprise a circuit-switching fabric wherein N and M are any positive integer. Further, it will be clear to those skilled in the art, after reading this specification, how to make and use alternative embodiments of the present invention wherein the N inputs and M outputs of circuit-switching fabric $614_i$ comprise:

(i) any asynchronous signal (e.g., DS0, DS1, DS3, etc.); or (ii) any SONET signal (e.g., STS-N, STS-Nc, etc.); or (iii) any combination of (i) or (ii).

The connectivity of the N inputs to the M outputs is controlled by processor $620_i$, which is described below and with respect to FIG. 7.

Circuit-switching fabric $614_i$ provides several functions: establishing trunk-line connections between packet-switching fabric $610_i$ and packet-switching fabrics located in other PACS routers; switching low-speed circuit-channels arriving from one TDM interface 418 to another TDM interface 418; switching packet-channels that arrive from each of TDM interfaces 418 to channelized high-speed link 608. In conjunction with cross-connect fabrics of other PACS routers, circuit-switching fabric $614_i$ can form semi-static circuits, which maintain their connectivity for periods that can exceed several months.

Circuit-switching fabric $614_i$ interfaces with packet-switching fabric $610_i$ to provide efficient transport of services over PACS network 500, and to provide multiplexing and restoration functions. PACS router $502_i$ controls and manages the connectivity of circuit-switching fabric $614_i$ using signaling and routing protocols described below and with respect to FIG. 7.

Although the illustrative embodiment comprises a circuit-switching fabric, which comprises a matrix of electronic logic, it will be clear to those skilled in the art, after reading this specification, how to make and use alternative embodiments of the present invention in which an all-optical switching matrix is used instead of a matrix of electronic logic.

Packet-switching fabric $610_i$ is a matrix of electronic switches and logic circuitry. Packet-switching fabric $610_i$ receives a packet, reads the destination header of the packet, determines the next hop destination, and sends the packet out on the appropriate packet-channel or circuit-channel in channelized high-speed link 608.

Packet-switching fabric $610_i$ is connected with user equipment 506 via PACS access link 508. Packet switching fabric $610_i$ receives data for various services such as voice, internet, and video from the user equipment 506. Controlled by processor $620_i$, the packet-switching fabric segregates traffic and sends high-quality service packets such as voice to a circuit-channel and best-effort data to a packet-channel. The Packet-switching fabric $610_i$ receives data from both packet-channels and circuit-channels arriving from channelized high-speed link 608 and routes packets to appropriate user equipment 506 via PACS access link 508.

Packet-switching fabric $610_i$ receives best-effort traffic and high-quality traffic in the form of packets. Packet-switching fabric $610_i$ segregates these packets according to a quality of service requirement and/or destination. For example, and referring to FIGS. 5 and 6A, all packetized high-quality traffic transmitted by PACS router $502_1$ which has the final destination of $502_4$ is grouped into a single packet flow, also known as Forwarding Equivalency Class (FEC). This packet flow is then fed into a circuit-channel inside network link $504_1$ that connects to PACS router $504_2$. Other packets that are to be routed through packet-switching fabric $610_2$ of PACS router $502_2$ are grouped into a different FEC, which is fed into a packet-channel inside network link $504_1$. PACS router $502_1$ determines the bandwidth necessary for each packet-channel and each circuit-channel depending on the traffic volume to be carried on these channels.

When a new high-quality traffic request is received by PACS router $502_1$, PACS router $502_1$ first determines whether there is an existing circuit-channel between PACS router $502_1$ and PACS router $502_4$ that has enough spare capacity for a new high-quality traffic request that arrives at PACS router $502_1$ with the destination of PACS router $502_4$. If the existing circuit-channel has enough spare capacity, it is utilized to set up the call between PACS router $502_1$ and PACS router $502_4$. If, on the other hand, there is insufficient capacity on an existing circuit-channel to carry the requested high-quality traffic, PACS router $502_1$ establishes a new circuit-channel between PACS router $502_1$ and PACS router $502_4$ via, for example, PACS router $502_2$.

As described above, and with respect to FIG. 5, each circuit-channel bypasses the packet-switching fabrics of all intermediate PACS routers in a high-quality traffic circuit, thereby avoiding packet-forwarding delays that would be caused by the intermediate PACS routers. For example, a high-quality traffic circuit established between PACS router $502_1$ and PACS router $502_4$, bypasses packet-switching fabric $610_2$ of PACS router $502_2$, and thus avoids packet-forwarding delay that would be caused by intermediate PACS router $502_2$. In addition to the elimination of packet-forwarding delay at intermediate PACS router $502_2$, the packet-switching fabrics in each of PACS routers $502_1$, $502_2$, and $502_4$ do not need to handle packets for high-quality traffic in a different manner than packets for best-effort traffic. This eliminates the complexity of providing high-quality traffic transmission in PACS network 500.

Normally, best-effort traffic is routed in hop-by-hop fashion in PACS network 500. For example, best-effort traffic transmitted from PACS router $502_1$ to PACS router $502_4$ is first routed from packet-switching fabric $610_1$ to packet-switching fabric $610_2$ via a first packet-channel that interconnects packet-switching fabric $610_1$ to packet-switching fabric $610_2$. The best-effort traffic is then routed again from packet-switching fabric $610_2$ to packet-switching fabric $610_4$ via a second packet-channel that interconnects packet-switching fabric $610_2$ to packet-switching fabric $610_4$. Network scalability suffers due to the two-stage nature of this type of traffic routing.

PACS network 500 enables an alternative type of traffic routing, wherein a packet channel bypasses packet-switching fabrics in intermediary PACS routers. For example, a packet channel comprising best-effort traffic can be routed from PACS router $502_1$ to PACS router $502_4$ in a manner that bypasses packet-switching fabric $610_2$ of PACS router $502_2$. In this routing scheme, the packet-channel, which originates in packet-switching fabric $610_1$, passes through circuit-switching fabric $614_1$ of PACS router $502_1$ and terminates at packet-switching fabric $610_4$ of the PACS router $502_4$. This bypass routing scheme is particularly advantageous when there is sufficient best-effort traffic to justify the dedication of a packet-channel to this circuit (i.e., the packet-channel circuit between PACS router $502_1$ and PACS router $502_4$ as described in the example above). The bypass routing scheme enables better scalability, lower cost and higher reliability.

PACS network 500 makes use of IP-based signaling such as MPLS (Generalized MPLS designed for application in layers other than IP such as circuit) to set up the circuit-channel through PACS routers $502_1$, $502_2$, and $502_4$. PACS router $502_1$ also uses IP based routing such as OSPF to decide the most appropriate route for the circuit-channel. For example, the route through PACS routers $502_1$, $502_2$, and $502_4$ may not have sufficient link capacity to set up a new circuit. Using protocols such as OSPF, PACS routers $502_1$ through $502_5$ always maintain up-to-date databases for the availability and the status of network resources. Based on the network resources and cost associated with the links, PACS routers compute efficient routes for the channels. Then, using signaling schemes such as GMPLS, circuit-channels are set up through the circuit-switching fabrics $614_1$ through $614_5$ of PACS routers $502_1$ through $502_5$.

A variety of known route optimization algorithms (e.g., Dijkstra, Bellman-Ford, Suurballe, K-shortest path) with up-to-date link state databases created and maintained by protocols such as OSPF are used to establish new packet and circuit-channels or use existing packet or circuit-channels to route traffic efficiently. Best-effort data routing are typically be hop-by-hop using packet-channels like the traditional router network. PACS router $502_1$ aggregates best-effort data (particularly not sensitive to delay) into a packet-channel inside channelized high-speed link 608 between packet-switching fabric $610_1$ and circuit-switching fabric $614_1$. The packet-channel is then routed via circuit-switching fabric $614_2$ that is routed via packet-switching fabric $610_2$. Packet-switching fabric $610_2$ then determines the next hop and maps the best-effort data packets with other best-effort data originating in or passing through PACS router $502_2$ into another FEC that is fed into a second packet-channel originating from packet-switching fabric $610_2$. The second packet-channel is routed from PACS router $502_2$ to PACS router $502_4$ where the second packet-channel is terminated into packet-switching fabric $610_4$.

If there is enough best-effort service traffic that can be segregated between two distant PACS routers they can be mapped into a packet-channel routed through the circuit-switching fabrics in intermediate PACS routers to create bypass packet-channels that bypass packet-switching fabrics in one or more intermediate PACS routers. The flexible means of hop-by-hop or bypass routing of packet-channels provides a means of more efficient and better performing routing of best-effort services as well without adding any constraint in the network. There are several efficient known routing algorithms that can be used to make a decision on whether to utilize hop-by-hop packet-channels or bypass packet-channels for best-effort data.

Processor $620_i$ is a general purpose processor and control system comprising digital logic, a fabric control system, memory, data bases, software, protocols, and algorithms which are required for communicating with other PACS routers and maintaining desired connectivity for both packet fabric $610_i$ and circuit-switching fabric $614_i$. Processor $620_i$ is described below and with respect to FIG. 7.

TDM interfaces 418 provide connectivity between PACS router $502_i$ and other PACS routers through network links $504_i$, and connectivity between PACS router $502_i$ and user equipment 506. TDM interfaces also provide demultiplexing of high-speed signals such as OC-48 or OC-192 arriving from network interface $504_i$ to feed to the circuit-switching fabric $614_i$; multiplexing of low-speed signals arriving from circuit-switching fabric $614_i$ into high-speed signals such as OC-48 and OC-192 to be transmitted over a network link $504_i$ in preparation for transport to cross-connect fabrics located in other PACS routers.

Figure 6B:
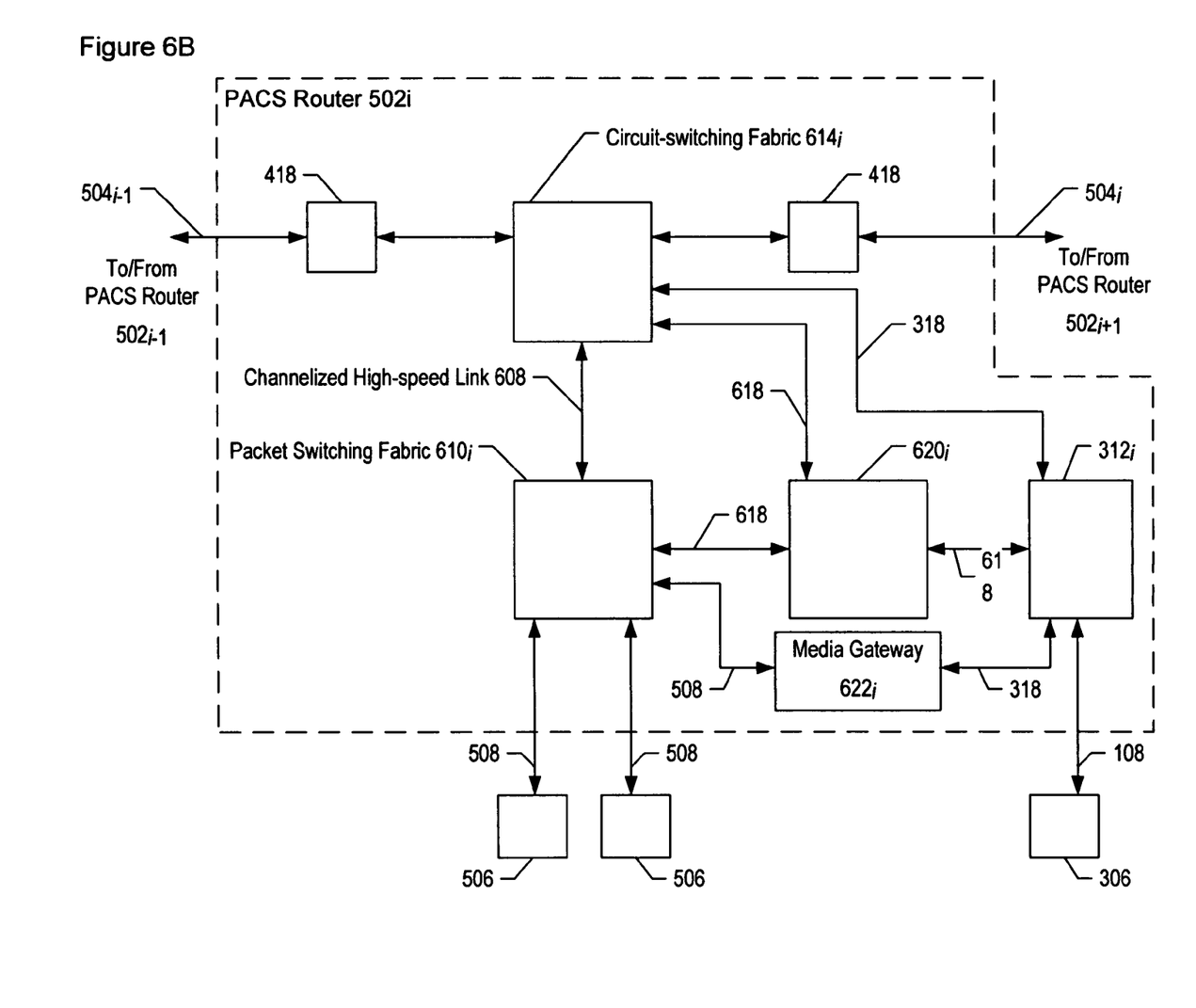
FIG. 6B depicts a block diagram of the salient aspects of a PACS router in accordance with an alternative embodiment of the present invention.

FIG. 6B depicts a block diagram of the salient aspects of a PACS router in accordance with an alternative embodiment of the present invention. In the alternative embodiment, PACS router $502_i$ further comprises voice-switch $312_i$ and media gateway $622_i$. Voice-switch $312_i$ is connected to the circuit-switching fabric via trunk link 318. Processor $620_i$ is connected to circuit-switching fabric $614_i$, packet-switching fabric $610_i$, and voice-switch $312_i$ via control links 618. Media gateway $622_i$ is connected with voice-switch $312_i$ and packet-switching fabric $610i$ via trunk link 318 and PACS access link 508, respectively.

In the alternative embodiment, voice-switch $312_i$ is a Class V switch, which connects voice telephones and other voice circuit devices directly to PACS router $502_i$. In some other alternative embodiments, voice-switch $312_i$ is an alternative voice-switch such as a private automatic brunch exchange commonly known in the industry as PABX.

Media gateway $622_i$ comprises electronic logic for converting voice circuits into packets, and transmitting the converted packets to packet-switching fabric $610_i$. Media gateway $622_i$ also converts packets carrying high-quality traffic into voice circuits and send to the voice-switch $312_i$. Processor $620_i$ determines if a call originating from user terminal 308 is to be connected at the other end to a user terminal, which is connected to another voice-switch $312_j$ in PACS network 500. The voice-switch then connects the voice circuit directly to the circuit-switching fabric $614_i$ via trunk link 318. If processor $620_i$ determines that the call is to be connected to a networking device connected to a networking device 106, which is connected to an IP router $102j$ in IP network 102 or to a PACS router $502_j$ in PACS network 500, then voice-switch $312_j$ connects the voice circuit to media gateway $622_i$ via trunk link 318.

Circuit-switching fabric $614_i$ routes the voice circuit received from voice-switch to another PACS router $502_j$ directed by processor $620_i$ via control link 318.

Media gateway $622_i$ converts voice signals from circuit format into packet format, and sends the packets (i.e., the converted voice signals) to packet-switching fabric $610_i$. Packet-switching fabric $610_i$ switches the packets into an appropriate circuit-channel within channelized high-speed link 608 to be routed to another PACS router via circuit-switching fabric $614_i$.

Figure 7:
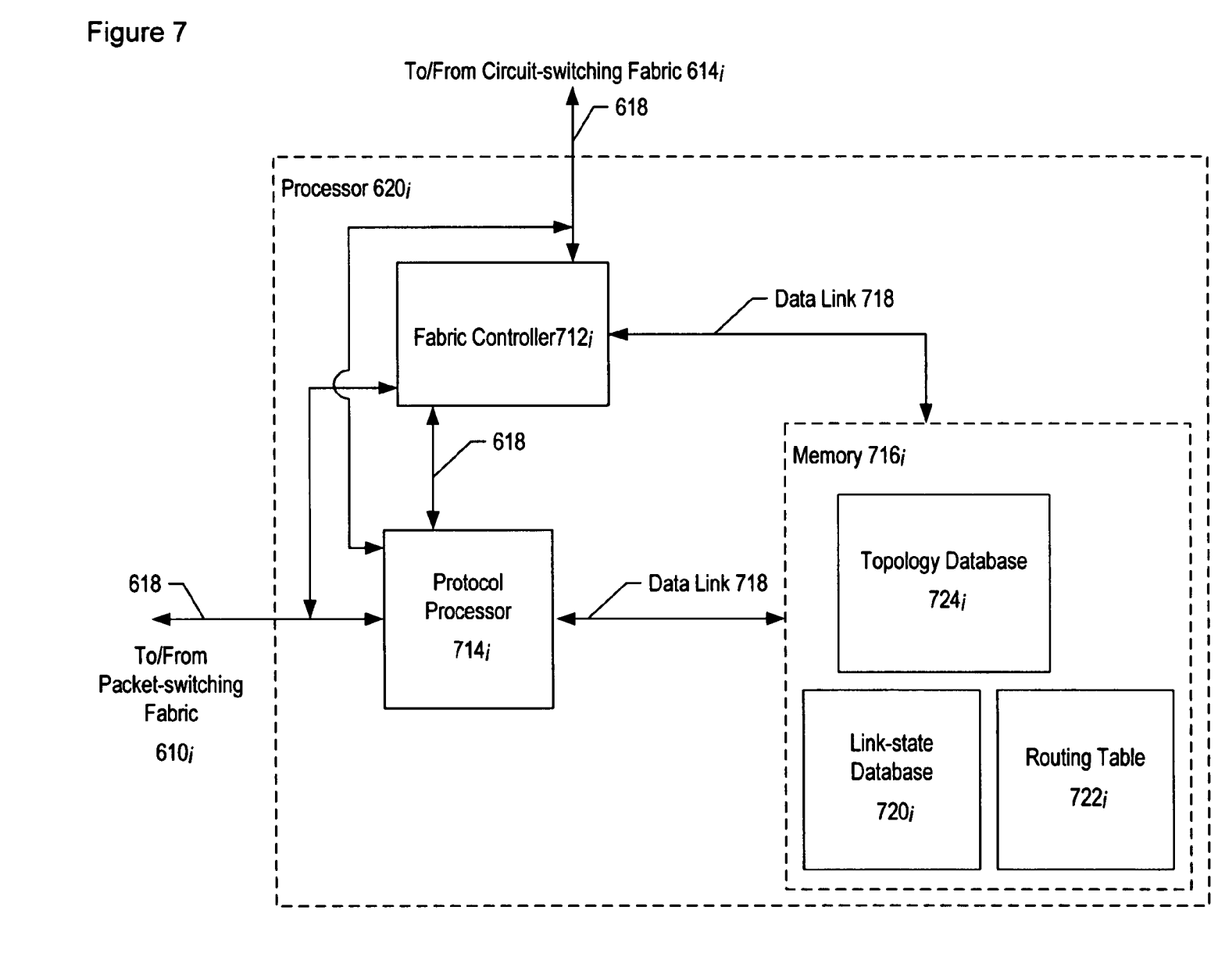
FIG. 7 depicts a block diagram of the salient aspects of processor $620_i$ in accordance with the illustrative embodiment of the present invention.

FIG. 7 depicts a block diagram of the salient aspects of processor $620_i$ in accordance with the illustrative embodiment of the present invention. Processor $620_i$ comprises fabric controller $712_i$, protocol processor $714_i$, and memory $716_i$. Memory $716_i$ includes link-state database $720_i$, routing table $732_i$, and topology database $724_i$. Protocol processor $714_i$ and fabric controller $712_i$ are connected to memory $716_i$ via data links 718.

Fabric controller $712_i$ comprises digital logic and provides the control signals sent to configure packet fabric $610_i$, circuit-switching fabric $614_i$ and voice-switch $312_i$. Fabric controller $712_i$ provides the control signals in response to call control messages received from protocol processor $714_i$.

Memory $716_i$ is a general-purpose memory cell well-known to those skilled in the art. Memory $716_i$ contains protocols and databases, which are necessary for the proper operation of PACS router $502_i$ in PACS network 500. These protocols and databases include link-state database $720_i$, topology database $724_i$, and routing table $722_i$.

Protocol processor $714_i$ comprises control logic and generates call control messages in response to connectivity requests generated by user equipment 506. User equipment 506 makes use of a variety of signaling means such as Session Initiation Protocol (SIP) for call (also known as session) connection in PACS network 500 to generate call control messages. Packets marked as control packets are utilized to carry signaling and other control messages. Packet-switching fabric $610_i$ sends signaling packets received from user equipment 506 to protocol processor $714_i$.

Protocol processor $714_i$ receives data from topology database $724_i$, link state database $720_i$ and routing table $722_i$. With the received data and the requested call set up message received from packet-switching fabric $610_i$, protocol processor $714_i$ computes the call route and generates fabric control messages for PACS router $502i$ and PACS router control messages for PACS routers $502_j$ to set up the call. Protocol processor $714_i$ sends fabric control messages to fabric controller $712_i$ and sends router control messages to packet-switching fabric $610_i$. Router control messages are embedded in packets addressed to appropriate target PACS router $502_j$.

Protocol processor $714_i$ uses two types of router control messages. A first type of router control messages are used to route circuit-channels that start at the call originating PACS router $502_i$, pass through the circuit-switching fabrics of a set of intermediate PACS routers $502_j$ through $502_i$ and terminate at a PACS router $502_n$. Protocol processor $714_i$ uses second types of router control messages to route individual packets over packet-channels that start at the call originating PACS router $502_i$, pass through the all the circuit-switching fabrics over packet-channels and one or more packet-switching fabrics of a set of intermediate PACS routers $502_j$ through $502_i$ and terminate at a PACS router $502_n$.

While a circuit-channel never passes through the packet-switching fabrics of the intermediate PACS routers, both circuit-channel and packet-channel are originated from the packet-switching fabric of the service originating PACS router $502_i$ and are terminated at the packet-switching fabric of the service terminating PACS router $502_n$.

It is to be noted that there is a scenario in which a circuit-channel may not pass through the packet-switching fabrics at the originating and terminating PACS routers. With respect to FIG. 6B, if a call is started at the voice-switch $312_i$ and ends at another voice-switch $312_n$ then there is no need for the call to be converted into packet by the media gateway $622_i$. In this type of router configuration, processor $620_i$ sends the call directly via circuit-switching fabric $614_i$.

A router control message consists of connection messages for circuit-switching fabric indicating which input should be connected to which output and packet routing messages for the packet-switching fabric. Packet routing messages include Open Shortest Path First (OSPF) protocol messages in which network connectivity information such as link state database information is transmitted from one PACS router to other.

Neighbor discovery is a mechanism by which a PACS router communicates with every PACS router that is directly connected via network link $504_i$. TDM interface $418$ on a network link $504i$ sends and receives neighbor discovery messages via SONET overhead bytes to generate neighbor connectivity information. The neighbor connectivity information is received by the protocol processor $714i$ via packet switching fabric $610i$. Protocol processor writes the entire neighbor connectivity information into the link-state database $720i$.

Protocol processor $714_i$ distributes neighborhood connectivity information of PACS router $502_i$ using OSPF messages. OSPF was developed for working with traditional routers. A modified OSPF known as OSPF-TE (Traffic Engineering) was developed to be used with other types of networks. OSPF-TE can be used for sending link-state information where links include both packet and circuit-channels.

Protocol processor $714_i$ receives neighborhood connectivity information via packet routing messages from every other PACS router connected in PACS network $500$ and writes the information into topology database $724_i$. In addition, whenever there is a change in a link status such as connecting input to out in circuit-switching fabric in response to new call set up, existing call tear-down, and addition of best-effort service calls in an existing packet-channel in a packet-switching fabric, processor $714_i$ sends update messages to every other PACS router. Processor $714_i$ also writes the link status change information into topology database $724_i$. Thus, topology database $724_i$ always maintains up-to-date information on network connectivity, link status, link usage status, type of channels (circuit or packet) within a link, and usage status of circuit and packet-channels in all links in PACS network $500$. It will be clear to those skilled in the art, after reading this specification, how to make and use embodiments of the present invention wherein many link status changes are collected and sent together when a pre-determined threshold is reached. In this way, a proper balance of the frequency of status change messages and optimality of network capacity usage can be maintained.

Protocol processor $714_i$ uses routing algorithms to compute optimal routes for packets with different destination addresses and quality of service required that are contained in the packet overhead. Optimal route computation includes determination of next hop PACS router for best-effort packets; whether to use an existing packet-channel for best-effort services; whether to use an existing circuit-channel for high-quality services; whether to create a new packet-channel for best-effort services; and through which intermediate PACS routers and network links newly computed circuit and packet-channels should pass. Protocol processor $714i$ sends appropriate router control messages to other PACS routers to configure circuit-switching and packet-switching fabrics to establish new circuit and packet-channels.

Based on next hop router computation for best-effort services, processor $714_i$ writes next hop information into routing table $722_i$. When a best-effort data packet arrives at packet-switching fabric $610_i$, fabric controller looks up routing table to determine next hop and the packet-channel to be used for sending the packet to the next hop PACS router. The mechanism of routing table lookup, instead of computation every time a packet needs to be forwarded, enables packet-switching fabric $610_i$ to forward millions of packets every second. Fabric controller $712_i$ uses data link $718$ for routing table lookup.

When PACS router $502_i$ detects a failure on one of its associated network links (e.g., $504_{i-1}$ or $504_i$, as described above and with respect to FIG. 6A) or on one of its TDM interfaces $418$, PACS router $502_i$ sends a failure detection message to protocol processor $714_i$. Protocol processor $714_i$ reads data from topology database $722_i$ and determines if there is enough idle capacity or best-effort traffic that can be pre-empted in other network links in PACS network $500$. Protocol processor $714_i$ then computes one or more alternate routes via circuit-switching fabrics in other PACS routers, sends routing messages to the PACS routers on the alternate routes. These routing messages instruct the PACS routers to configure their circuit-switching fabrics such that failed services originally being transported over the failed link are restored. This restoration mechanism, using only circuit-switching fabrics in PACS routers, results in fast and robust restoration of high-quality traffic.

In some alternative embodiments, packet-switching and circuit-switching fabrics are loosely coupled, wherein a stand-alone packet-switching router and a stand-alone circuit-switching cross-connect system are connected via high-speed electrical or optical links and control links. Control links provide the means of data transport and control mechanism required for the two packet-switching and circuit-switching fabrics to work in harmony as described in the illustrative embodiment.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising:
   (1) a first device, wherein said first device is a device for switching circuits;
   (2) a second device, wherein said second device is a device for switching packets; and
   (3) a first processor;
   wherein said first processor is coupled with said first device and said second device;
   wherein said first device and said second device are coupled via a channelized high-speed link;
   wherein said second device receives network traffic from user devices;
   wherein said first processor maps a first portion of said network traffic from said second device on to a first channel of said channelized high-speed link and routes said first channel through said first device;
   wherein said first processor maps a second portion of said network traffic from said second device on to a second channel of said channelized high-speed link and routes said second channel through said first device;
   wherein said first portion and said second portion of said network traffic are determined based on a parameter of said network traffic; and
   wherein said first processor comprises a restoration protocol, wherein said restoration protocol reroutes said first channel via said first device in response to detection of a network failure.

2. The apparatus of claim 1 further comprising a first interface for directly connecting said first device to a third device, wherein said third device is a device for switching circuits.

3. The apparatus of claim 2 further comprising:
   said third device;
   a fourth device, wherein said fourth device is a device for switching packets; and
   a second processor;
   wherein said second processor is coupled with said third device and said fourth device;
   wherein said third device and said fourth device are coupled; and
   wherein said first device and said third device are connected via said first interface.

4. The apparatus of claim 1 wherein said parameter is selected from the group consisting of required quality-of-service, required latency, required reliability, and required priority.

5. The apparatus of claim 1 wherein said first processor comprises a networking protocol;
   wherein said networking protocol sends a message to said second processor to route said first channel via said third device;
   wherein said networking protocol sends a message to said second processor to route said second channel via said third device and said fourth device.

6. The apparatus of claim 1 wherein each of said first channel and second channel comprises one of or a combination of:
   (1) Time Division Multiplex (TDM),
   (2) Synchronous Digital Hierarchy (SDH),
   (3) Synchronous Optical Network (SONET), and
   (4) Wavelength Division Multiplex (WDM).

7. The apparatus of claim 1 wherein said network traffic comprises one of or a combination of:
   (1) IP packet,
   (2) Ethernet packet,
   (3) Frame Relay packet, and
   (4) Multi-Protocol Label Switching (MPLS) packet.

8. A network comprising:
   (1) a first packet-switching and circuit-switching (PACS) router, wherein said first PACS router comprises;
      (a) a first device for switching circuits;
      (b) a second device for switching packets;
      (c) a first processor; and
      (d) a first interface for directly connecting said first device to a third device for switching circuits;
      wherein said first processor is coupled with said first device and said second device;
      wherein said first device and said second device are coupled;
      wherein said first processor maps a first portion of network traffic from said second device to a first channel based on a parameter of said network traffic and destination of said first portion of said network traffic;
      wherein said first processor maps a second portion of said network traffic from said second device to a second channel based on said parameter of said network traffic;
      wherein said first channel and said second channel are routed through said first device to said third device via said first interface;
   (2) a second PACS router, wherein said second PACS router comprises;
      (a) said third device;
      (b) a fourth device for switching packets; and
      (c) a second processor; and
      wherein said second processor is coupled with said third device and said fourth device;
      wherein said third device and said fourth device are coupled;
      wherein said second processor routes said first channel via said third device to a third PACS router based on a first routing protocol;
      wherein said second processor routes said second channel via said third device to said fourth device based on said first routing protocol;
      wherein said second processor routes packets in said second channel via said fourth device based on a second routing protocol; and
   wherein each of said first, second and third PACS routers further comprises a restoration protocol, wherein said restoration protocol reroutes said first channel in response to detection of a network link failure.

9. The network of claim 8 wherein each of said first channel and said second channel comprises one of or a combination of:

(1) Time Division Multiplex (TDM),
(2) Synchronous Digital Hierarchy (SDH),
(3) Synchronous Optical Network (SONET), and
(4) Wavelength Division Multiplex (WDM).

10. The network of claim 8 wherein said network traffic comprises one of or a combination of:
(1) IP packet,
(2) Ethernet packet,
(3) Frame Relay packet, and
(4) Multi-Protocol Label Switching (MPLS) packet.

11. The network of clam 8 wherein said first channel carries high-quality network traffic between said first PACS router and said third PACS router.

12. The network of claim 8 wherein said second channel carries best-effort network traffic having destinations to said second PACS router and to said third PACS router.

13. The network of claim 8 wherein said parameter is selected from the group consisting of required quality-of-service, required latency, required reliability, and required priority.

14. The network of claim 8 wherein said first routing protocol comprises a connection oriented protocol to set up connections for said first channel between said first PACS router and said third PACS router via said third device in said second PACS router.

15. The network of claim 8 wherein said second routing protocol comprises a packet routing protocol including Internet Protocol to set up connections for said second channel between said first PACS router and said second PACS router via said first device in said first PACS router and via said third device in said second PACS router.

16. A method for routing best-effort traffic and high-quality traffic in a communications network comprising:
routing a first portion of network traffic by a circuit-switching device and routing a second portion of network traffic by said circuit switching device and a first packet switching device, based on a parameter of said network traffic;
combining said first portion of network traffic and a third portion of network traffic arriving from a second packet switching device to compose a combined network traffic, wherein said first portion of network traffic and said third portion of network traffic have a service quality requirement greater than a first threshold;
determining the capacity requirement of said combined network traffic;
determining available capacity of a first circuit-channel;
mapping said combined network traffic onto said first circuit-channel when the available capacity of said first circuit-channel is greater than the capacity requirement of said combined network traffic;
determining the available capacity of a second circuit-channel; and
mapping said combined network traffic onto said second circuit-channel when the available capacity of said second circuit-channel is greater than the capacity requirement of said combined network traffic and the available capacity of said first circuit-channel is less than the capacity requirement of said combined network traffic.

17. The apparatus of claim 16 wherein said parameter is selected from the group consisting of required quality-of-service, required latency, required reliability, and required priority.

18. The method of claim 16 further comprising mapping said second portion of network traffic onto a packet-channel, wherein said second portion of network traffic has a service quality requirement below said first threshold.

* * * * *